(12) United States Patent
Hidaka et al.

(10) Patent No.: US 8,084,906 B2
(45) Date of Patent: Dec. 27, 2011

(54) BRUSHLESS MOTOR INCLUDING THRUST COVER FOR HOLDING THRUST PLATE

(75) Inventors: Masahito Hidaka, Tottori (JP); Kinjirou Okinaga, Tottori (JP); Koji Kuyama, Tottori (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 168 days.

(21) Appl. No.: 12/445,845

(22) PCT Filed: Oct. 9, 2007

(86) PCT No.: PCT/JP2007/069652
§ 371 (c)(1),
(2), (4) Date: Apr. 16, 2009

(87) PCT Pub. No.: WO2008/053670
PCT Pub. Date: May 8, 2008

(65) Prior Publication Data
US 2010/0314958 A1  Dec. 16, 2010

(30) Foreign Application Priority Data
Oct. 30, 2006 (JP) .................................. 2006-293399

(51) Int. Cl.
*H02K 5/16* (2006.01)
*H02K 7/08* (2006.01)
*F16C 32/06* (2006.01)
(52) U.S. Cl. .......................................... 310/90; 384/107
(58) Field of Classification Search .................... 310/90, 310/90.5, 67 R; 417/423.12; 360/99.08; 384/100, 107
See application file for complete search history.

(56) References Cited

U.S. PATENT DOCUMENTS
5,677,585 A * 10/1997 Ida et al. .......................... 310/91
5,822,846 A * 10/1998 Moritan et al. .................. 29/598
6,018,442 A *  1/2000 Verbunt et al. ............. 360/271.2
(Continued)

FOREIGN PATENT DOCUMENTS
JP           8-214487              8/1996
(Continued)

OTHER PUBLICATIONS
Definition of Integral, http://dictionary.reference.com/browse/integral.*

*Primary Examiner* — Quyen Leung
*Assistant Examiner* — Thomas Truong
(74) *Attorney, Agent, or Firm* — Steptoe & Johnson LLP

(57) ABSTRACT

A brushless motor is provided which has excellent anti-impact properties and is easily assembled even if the brushless motor is reduced in size. A stator (2) includes a bearing (5) for holding a rotating shaft (3), a bearing housing (6) in which the bearing (5) is placed vertically relative to the stator base (1), a thrust plate (7) for receiving one end of the rotating shaft (3) in a thrust direction, a metal thrust cover (8) for holding the thrust plate (7), a metal installation member (25) including an annular section (25a) which is superposed over a base (6b) of the bearing housing (6) and projecting pin sections (25b) which project from the annular section (25a) to the outer periphery of the thrust cover (8). The projecting pin sections (25b) of the installation member (25) have projection sections welded to the thrust cover (8).

4 Claims, 5 Drawing Sheets

U.S. PATENT DOCUMENTS

| | | | |
|---|---|---|---|
| 6,242,830 B1 * | 6/2001 | Katagiri | 310/90 |
| 6,756,715 B2 * | 6/2004 | Yano et al. | 310/90 |
| 7,350,975 B2 * | 4/2008 | Uenosono et al. | 384/107 |
| 2002/0117911 A1 | 8/2002 | Fukutani | 310/67 R |
| 2003/0164653 A1 * | 9/2003 | Yasuda | 310/90 |
| 2004/0189113 A1 | 9/2004 | Kuribara | 310/67 R |
| 2006/0006746 A1 * | 1/2006 | Nishikata et al. | 310/67 R |
| 2008/0037916 A1 * | 2/2008 | Hayashi et al. | 384/107 |

FOREIGN PATENT DOCUMENTS

WO    WO 2005098250 A1 * 10/2005

* cited by examiner

US 8,084,906 B2

BRUSHLESS MOTOR INCLUDING THRUST COVER FOR HOLDING THRUST PLATE

TECHNICAL FIELD

The present invention relates to a brushless motor.

BACKGROUND ART

Various brushless motors having high controllability and reliability over a wide rpm range have been used as motors for rotationally driving disks on which information is recorded and reproduced. Such brushless motors are disclosed in, for example, JP2002-262540A, JP08-214487A, JP2004-236390A, and so on.

As shown in FIG. 5, such a brushless motor is made up of a stator 52 serving as a non-rotating portion fixed to a stator base 51 serving as a base member, and a rotor 54 serving as a rotating portion integrally rotating with a rotating shaft 53.

The stator 52 includes a substantially cylindrical bearing 55 for rotatably holding the rotating shaft 53 of the rotor 54, a cylindrical bearing housing 56 placed vertically on the stator base 51 with the bearing 55 press-fit into the bearing housing 56, a thrust plate 57 which is disposed in a hole 51a formed on the stator base 51 and comes into contact with the rotating shaft 53 from the proximal end of the rotating shaft 53 (the end opposite to the end where a rotated object is loaded) in a thrust direction to rotatably support the rotating shaft 53, a thrust cover 58 for holding the thrust plate 57 from below, and a winding assembly 61 composed of a core 59, being fit onto the bearing housing 56, a coil 60, and so on.

As described above, the brushless motor configured thus includes the thrust plate 57 which receives the rotating shaft 53 in the thrust direction (to be specific, from the end opposite to the end where a disk is mounted as a rotated object) and the thrust cover 58. The thrust plate 57 and the thrust cover 58 may be integrally formed.

The thrust cover 58 is fixed as follows:

In a brushless motor disclosed in JP2002-262540A, as shown in FIG. 5, the thrust cover 58 is a closed-end cylinder. In the assembling process, the upper part of the thrust cover 58 is fit into the bottom of the bearing housing 56 as indicated by the virtual lines of FIG. 5. In the brushless motor, the bearing housing 56 is integrally formed with the stator base 51 by burring.

In a brushless motor disclosed in JP08-214487A, as shown in FIG. 6, a thrust cover 71 is formed like a disk. The outer periphery of the thrust cover 71 and a stator base 73 (to be specific, a hole surrounding section 73a of the stator base 73) are fixed by welding or bonding such that the thrust cover 71 closes the bottom of a space in a bearing housing 72 where a thrust pad 74 and a bearing 75 are stored.

In a brushless motor disclosed in JP2004-236390A, as shown in FIG. 7, the bottom of a cylindrical bearing housing 81 has a resin thrust cover 82 molded by outsert molding.

DISCLOSURE OF THE INVENTION

In the case where such brushless motors are mounted in portable equipment, the brushless motors have to be further reduced in size (for example, the outside shapes (diameters) of the brushless motors have to be about 10 mm or less) and it is simultaneously desirable to improve the anti-impact properties to prevent damage on the brushless motors even when the portable equipment falls.

However, when the brushless motor disclosed in patent document 1 of FIG. 5 is used thus in portable equipment, the load of the rotor 54 may concentrate on the thrust cover 58 through the rotating shaft 53 in the event of a fall. At this moment, the thrust cover 58 may be disadvantageously separated from the bearing housing 56.

In the case of the brushless motor disclosed in JP08-214487A, when the brushless motor is reduced in size for use in portable equipment, the outer periphery of the thrust cover 71 and the stator base 73 are fixed by welding. In this case, it takes a long time to properly weld the boundary of the outer periphery of the thrust cover 71 and the stator base 73, resulting in low working efficiency. Further, it may be difficult to visually confirm whether the boundary is properly welded or not.

In the brushless motor disclosed in JP2004-236390A, the thrust cover 82 is made of resin and thus has a low strength against an impact, resulting in insufficient reliability.

The present invention has been devised to solve the problems. An object of the present invention is to provide a brushless motor which has excellent anti-impact properties and is easily assembled even if the brushless motor is reduced in size.

In order to solve the problems, a brushless motor of the present invention includes: a stator serving as a non-rotating portion fixed to a base member; and a rotor serving as a rotating portion integrally rotating with a rotating shaft, the stator including: a bearing for rotatably holding the rotating shaft from the outer periphery; a bearing housing which includes a cylindrical section having the bearing mounted therein and a base placed on the base member, and has the bearing placed vertically relative to the base member; a thrust plate which comes into contact with the end of the rotating shaft in a thrust direction and rotatably receives the end of the rotating shaft; a metal thrust cover for holding the thrust plate; and a metal installation member including an annular section which is superposed over the base of the bearing housing and projecting pin sections each of which projects from the annular section through an insertion hole formed on the base member and one of a hole and a recessed section formed on the thrust cover, wherein the projecting pin sections of the installation member have projection sections welded to the thrust cover, the projection sections projecting from the thrust cover.

A method of manufacturing the brushless motor according to the present invention, including: projecting the projecting pin sections of the installation member from points near the outer periphery of the thrust cover through the insertion holes of the base member; and welding the projection sections of the projecting pin sections to the thrust cover by arc discharge from points near the projecting pin sections.

In the assembling process of the brushless motor, the sections projecting from the thrust cover out of the projecting pin sections of the installation member are welded to the thrust cover in a state in which the bearing housing, the thrust cover, and the installation member are assembled to the base member, so that the thrust cover can be firmly joined. In other words, the metal installation member and the thrust cover are joined by welding with sufficient joining strength. Thus in the event of an impact, it is possible to positively prevent the thrust cover from being separated from the base member.

In this case, since the projecting pin sections of the installation member are projected from the thrust cover, the projection sections as welded points also act as guides for recognizing the welded points, so that the welded points can be easily recognized even in a smaller brushless motor and high workability can be achieved during welding. Further, arc welding is performed by discharge from the points near the projecting pin sections of the installation member in a state in which a metallic material electrically connected to the installation member, for example, the base member is connected to the electrodes of a welding machine. Thus arc discharge is naturally made to the sections projecting from the thrust cover out of the projecting pin sections with small discharge distances and welding can be accurately performed even with relatively rough positioning, thereby simultaneously achieving high reliability and extremely high workability.

The bearing housing and the installation member may be integrally formed or the bearing housing and the base member may be integrally formed. Thus it is possible to reduce the number of components and the cost of manufacturing.

As described above, according to the present invention, the metal installation member includes the annular section which is superposed over the base of the bearing housing and the projecting pin sections each of which projects from the annular section through the insertion hole formed on the base member and one of the hole and the recessed section formed on the thrust cover, and the sections projecting from the thrust cover out of the projecting pin sections of the installation member are welded to the thrust cover, so that the thrust cover can be firmly joined to the base member. Even in the event of an impact, it is possible to positively prevent the thrust cover from being separated from the base member, so that high strength is achieved and high reliability can be kept.

Further, in the assembling process of the brushless motor, the projecting pin sections of the installation member are projected from the thrust cover and thus can be easily recognized, so that high working efficiency can be achieved during welding. Thus it is possible to shorten the assembling time and, by extension, reduce the cost of manufacturing.

Moreover, arc welding is performed by discharge from the points near the projecting pin sections of the installation member. Thus arc discharge is naturally made to the sections projecting from the thrust cover out of the projecting pin sections with small discharge distances and welding can be accurately performed even with relatively rough positioning, thereby simultaneously achieving high reliability and extremely high workability.

BEST MODE FOR CARRYING OUT THE INVENTION

Figure 1:
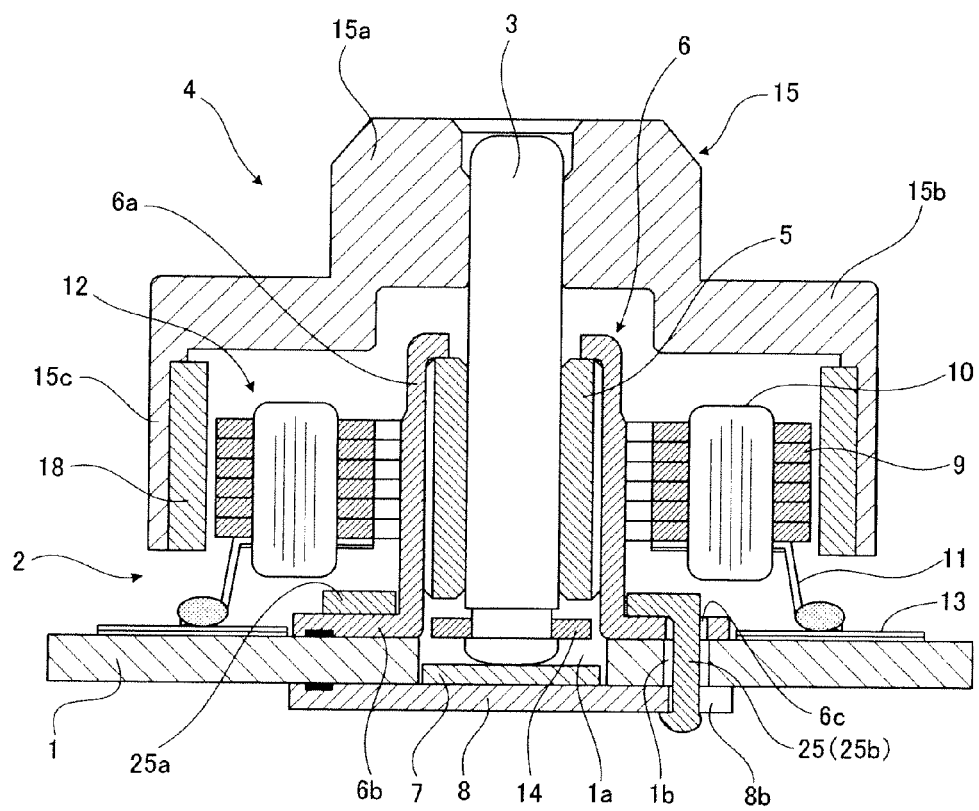
FIG. 1 is a sectional view showing a brushless motor according to a first embodiment of the present invention.
Figure 2:
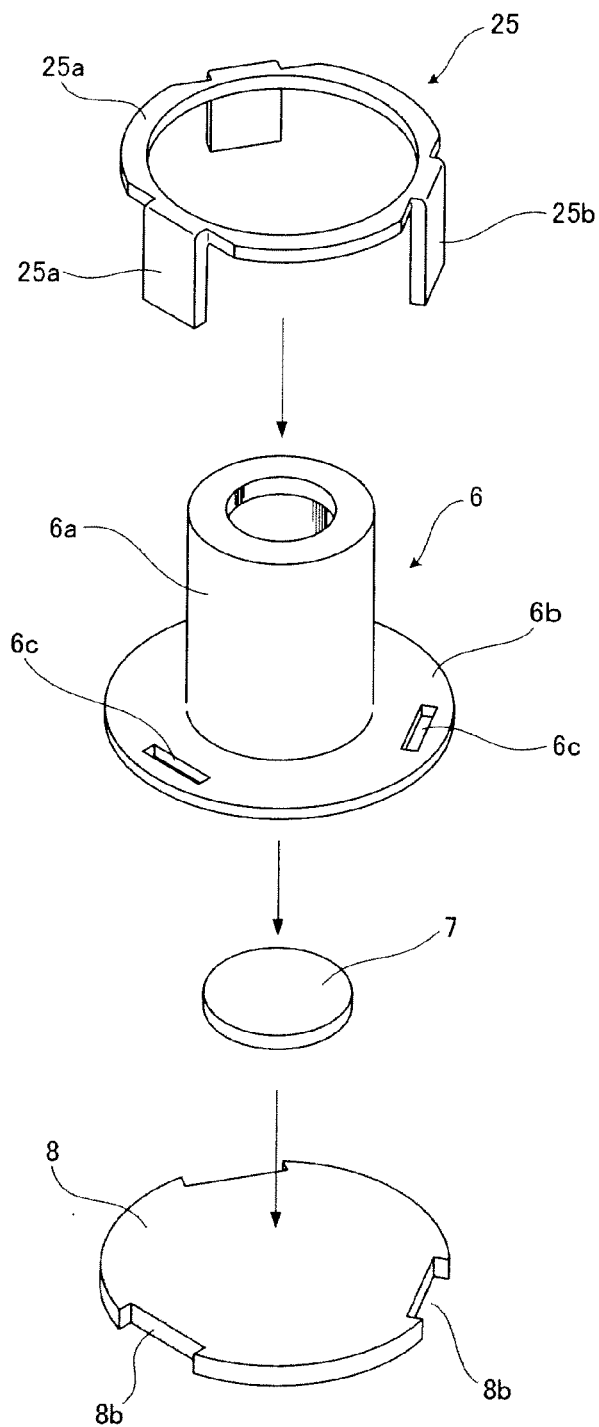
FIG. 2 is a perspective view of an installation member, a bearing housing, a thrust plate, and a thrust cover which are provided in the brushless motor.

The following will describe a brushless motor according to embodiments of the present invention with reference to the accompanying drawings. FIG. 1 is a front view showing the longitudinal section of a brushless motor according to a first embodiment of the present invention. FIG. 2 is a perspective view of an installation member, a bearing housing, a thrust plate, and a thrust cover which are provided in the brushless motor.

As shown in FIG. 1, the brushless motor is used for rotationally driving a removable disk on which information is recorded and reproduced. The outside shape of the brushless motor is about 10 mm. As shown in FIG. 1, the brushless motor is made up of a stator 2 serving as a non-rotating portion fixed to a stator base 1 serving as a base member, and a rotor 4 serving as a rotating portion integrally rotating with a rotating shaft 3.

As shown in FIGS. 1 and 2, the stator 2 is made up of the stator base 1 which is composed of a metal plate serving as a base member, a substantially cylindrical bearing 5 for rotatably holding the rotating shaft 3 from the outer periphery, a bearing housing 6 which is composed of a metal plate, includes a cylindrical section 6a having the bearing 5 mounted therein and a base 6b placed on the stator base 1, and has the bearing 5 placed vertically relative to the stator base 1, a disk-shaped thrust plate 7 which is disposed in a hole 1a formed on the stator base 1 and comes into contact with the rotating shaft 3 from the proximal end of the rotating shaft 3 (the end opposite to the end where a rotated object is mounted: in FIG. 1, the bottom end of the rotating shaft 3) in a thrust direction to rotatably support the rotating shaft 3, a thrust cover 8 which is composed of a metal plate and is attached near the hole 1a on the undersurface of the stator base 1 to close the hole 1a and hold the thrust plate 7 from below, a metal installation member 25 including an annular section 25a which is superposed over the base 6b of the bearing housing 6 and projecting pin sections 25b which project downward from the annular section 25a through insertion holes 6c formed on the bearing housing 6, insertion holes 1b formed on the stator base 1, and recessed sections 8b formed on the thrust cover 8 so as to be recessed toward the center of the thrust cover 8 in planar view, and winding assemblies 12 each of which is fit onto the cylindrical upright section 6a of the bearing housing 6 and is made up of a core 9, a coil 10, and a terminal 11. The legs of the terminal 11 are connected by soldering to a flexible substrate 13 bonded on the stator base 1. Reference numeral 14 in FIG. 1 designates a stopper for preventing the rotating shaft 3 from being removed out of the bearing 5 of the stator 2.

In the present embodiment, the bearing 5 made of a sintered metal is impregnated with oil to rotatably support the rotating shaft 3. The present embodiment is not limited to this configuration.

The rotor 4 has a rotor frame 15 serving as an outer shell. The rotor frame 15 is made up of a boss 15a attached to the leading end of the rotating shaft 3, a turn table 15b radially extended like a disk from the bottom of the boss 15a to the outer periphery, and a cylindrical section 15c cylindrically extending downward from the outer periphery of the turn table 15b so as to cover the winding assemblies 12 from the outer peripheries. A driving magnet 18 opposed to the cores 9 is attached on the inner periphery of the cylindrical section 15c of the rotor frame 15.

The bearing housing 6 is secured to the stator base 1 by welding or bonding and the like on an outer part of the base 6b. Particularly in the present invention, in addition to the fixation of the bearing housing by welding, bonding, and the like, the projecting pin sections 25b of the installation member 25 have portions projecting downward from the thrust cover 8 and welded to the thrust cover 8, to be specific, to portions where the recessed sections 8b of the thrust cover 8 are provided. In the present embodiment, the projecting pin sections 25b are disposed at three points at proper angles along the circumferential direction of the annular section 25*a* of the installation member 25 and are integrally formed so as to be bent downward from the annular section 25*a*.

The stator 2 configured thus is assembled as follows:

The bearing housing 6 is fixed on the stator base 1 by welding or bonding and the like at a point corresponding to the outer part of the base 6*b* of the bearing housing 6 on the stator base 1. Next, the flexible substrate 13 is bonded to the stator base 1, the assembled winding assemblies 12 are fit onto the bearing housing 6, the terminals 11 of the winding assemblies 12 are soldered onto the flexible substrate 13, and the bearing 5 is press-fit into the bearing housing 6.

The rotor 4 is assembled by bonding the magnetized driving magnet 18 on the inner periphery of the cylindrical section 15*c* of the rotor frame 15 after the rotating shaft 3 is press-fit into the boss 15*a* of the rotor frame 15.

Next, the rotating shaft 3 of the rotor frame 15 is inserted into the bearing 5 of the stator 2, the stopper 14 is attached to the bottom end of the rotating shaft 3, and the thrust cover 8 is secured to the undersurface of the stator base 1.

The thrust cover 8 is attached as follows: on the undersurface of the stator base 1, the thrust cover 8 is placed inside the projecting pin sections 25*b* of the installation member 25 projecting from the undersurface of the stator base 1, and then arc welding is performed on the projecting pin sections 25*b* of the installation member 25, so that the projection sections of the projecting pin sections 25*b* are welded to the thrust cover 8. In the arc welding, a metallic material electrically connected to the installation member 25, for example, the stator base 1 is connected to one electrode (generally, on the earth side) of a welding machine. In this state, the other electrodes (including a welding rod, a welding wire, and a TIG torch which will be referred to as the other electrodes) of the welding machine are disposed at points near the projecting pin sections 25*b* of the installation member 25 and welding is performed by arc discharge from these points. Thus during welding, charge is naturally discharged to the sections projecting from the thrust cover 8 out of the projecting pin sections 25*b* with small discharge distances, and the projection sections of the projecting pin sections 25*b* can be welded and properly secured to the thrust cover 8. In other words, without disposing the other electrodes of the welding machine at correct positions, charge can be naturally discharged to the sections projecting from the thrust cover 8 out of the projecting pin sections 25*b* and welding is properly performed only by bringing the other electrodes close to the projecting pin sections 25*b* of the installation member 25, thereby achieving extremely high workability and high working efficiency.

After that, non-slip rubber for disks is bonded to the rotor 4 when necessary, so that the brushless motor is completed. In the brushless motor, the rotor 4 and the rotating shaft 3 are rotated by passing current through the coils 10.

With this configuration, the projecting pin sections 25*b* of the metal installation member 25 are projected through the stator base 1 to points where the thrust cover 8 is disposed, and then the projection sections are welded to the thrust cover 8. Thus, the thrust cover 8 can be firmly joined to the stator base 1 and so on. In other words, the metal installation member 25 and the thrust cover 8 are joined by welding with sufficient joining strength, so that it is possible to positively prevent the thrust cover 8 from being separated from the stator base 1. Thus even if portable equipment in which the brushless motor is mounted falls and receives an impact, it is possible to prevent the thrust cover 8 from being separated from the stator base 1 and causing failures in the brushless motor, so that high reliability can be kept.

Since the projecting pin sections 25*b* of the installation member 25 are projected from the thrust cover 8, the projection sections as welded points also act as guides for recognizing the welded points, so that the welded points can be easily recognized even in a smaller brushless motor and the working efficiency is improved. Further, as described above, arc welding is performed by discharge from the points near the projecting pin sections 25*b* of the installation member 25, so that on the sections projecting from the thrust cover 8 out of the projecting pin sections 25*b* with small discharge distances, welding can be performed by natural arc discharge without correctly disposing the other electrodes of the welding machine. Thus it is possible to accurately perform welding even with relatively rough positioning, thereby simultaneously achieving high reliability and extremely high workability.

Further, in arc welding, the ends of the projecting pin sections 25*b* are rounded while being evenly expanded to the thrust cover 8 (to the center of the thrust cover 8 in the present embodiment) by the surface tension, so that the heights of projections are stabilized and high quality is easily maintained.

Moreover, the outer periphery of the thrust cover 8 is not entirely welded but only some points of the thrust cover 8 are welded (in the present embodiment, three points in the circumferential direction), thereby reducing an amount of welding output.

Further, in the present embodiment, the base 6*b* of the bearing housing 6 is sandwiched between the installation member 25 and the stator base 1. Thus the bearing housing 6 can be advantageously held with the cylindrical section 6*a* properly placed vertically relative to the stator base 1.

Figure 3:
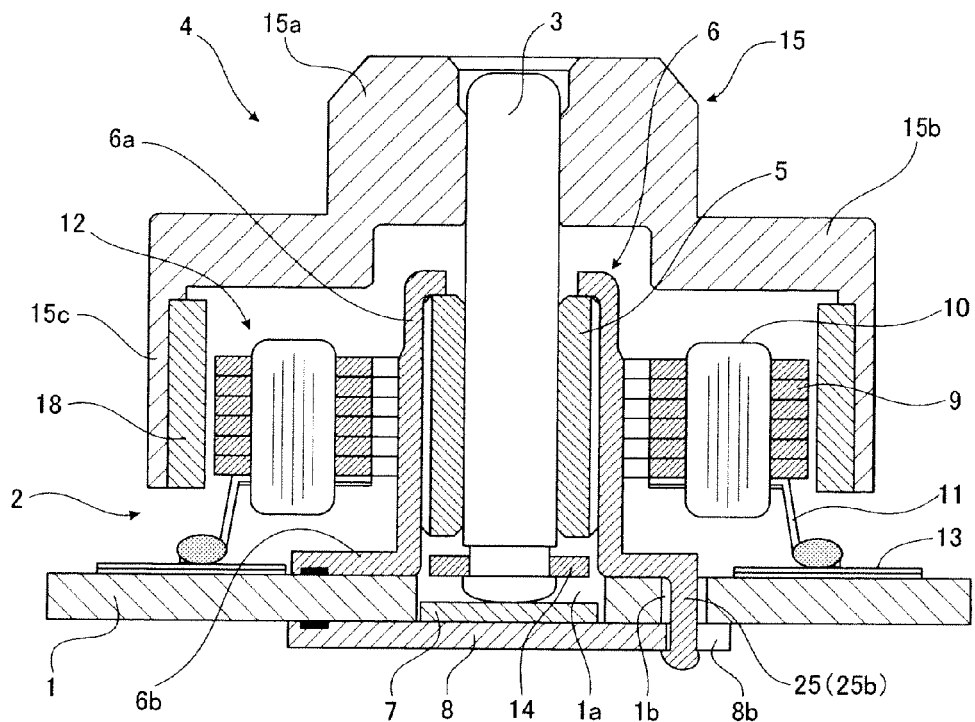
FIG. 3 is a sectional view showing a brushless motor according to a second embodiment of the present invention.
Figure 4:
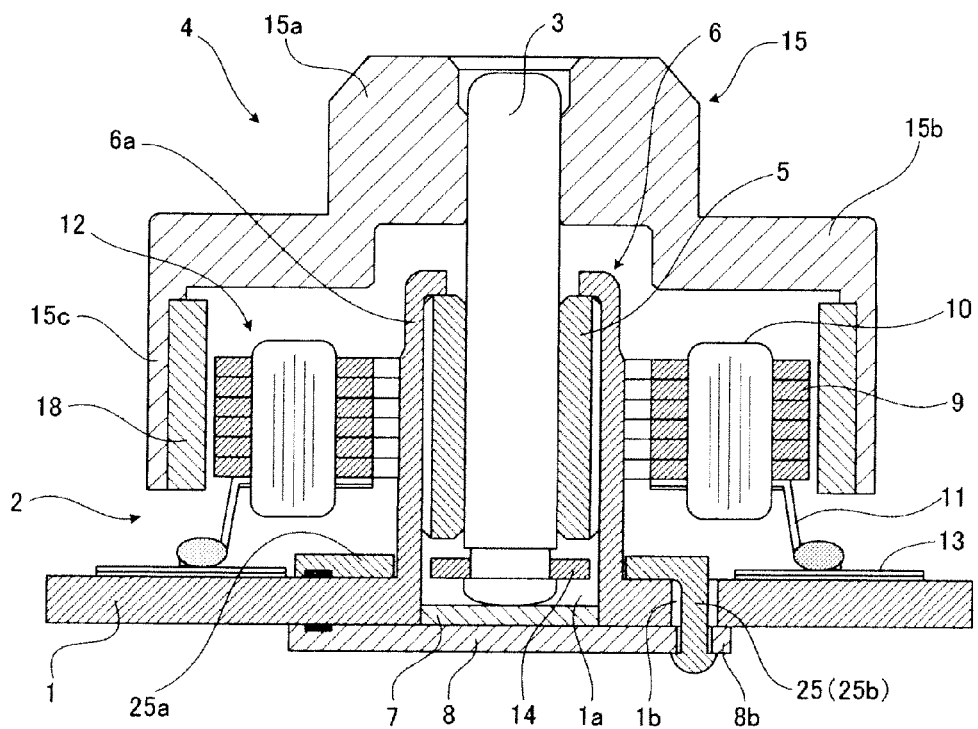
FIG. 4 is a sectional view showing a brushless motor according to a third embodiment of the present invention.
Figure 5:
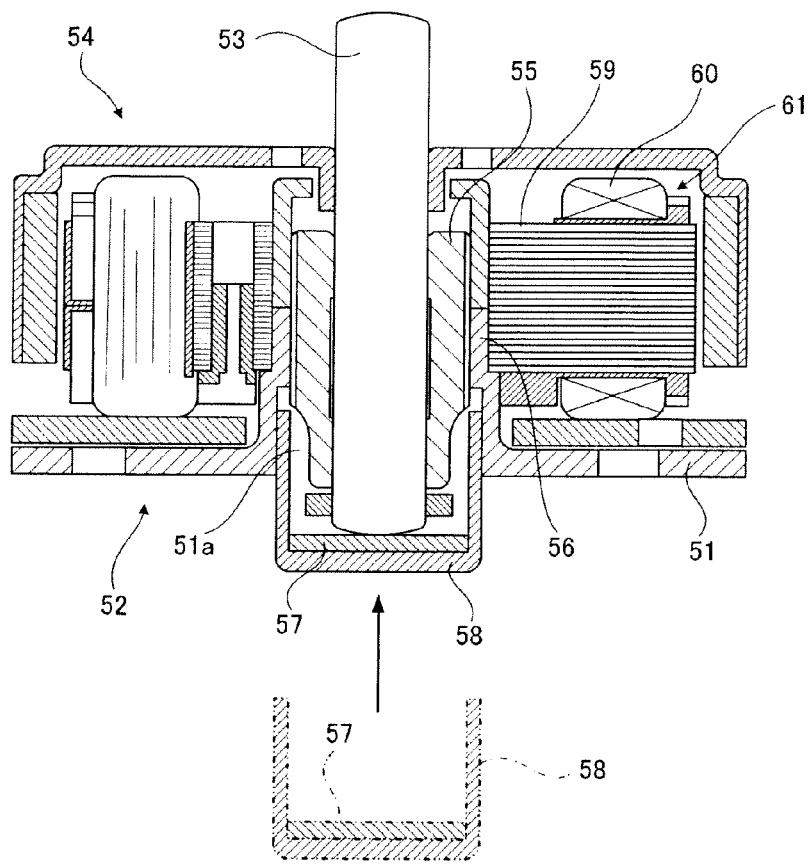
FIG. 5 is a sectional view showing a brushless motor of the prior art.
Figure 6:
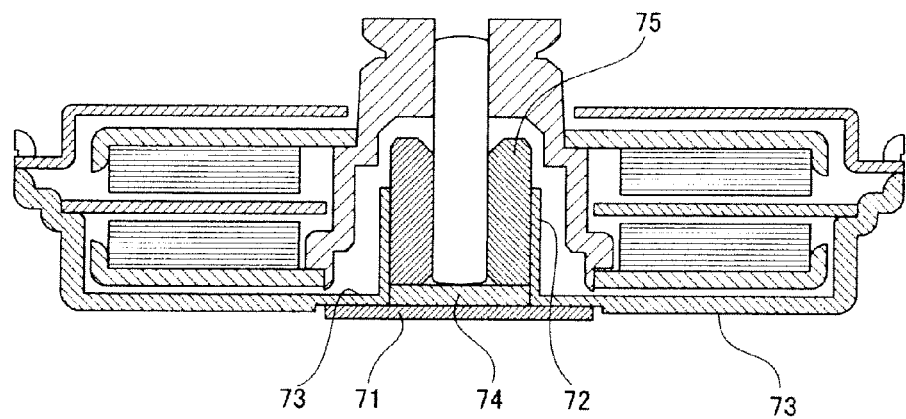
FIG. 6 is a sectional view showing another brushless motor of the prior art.
Figure 7:
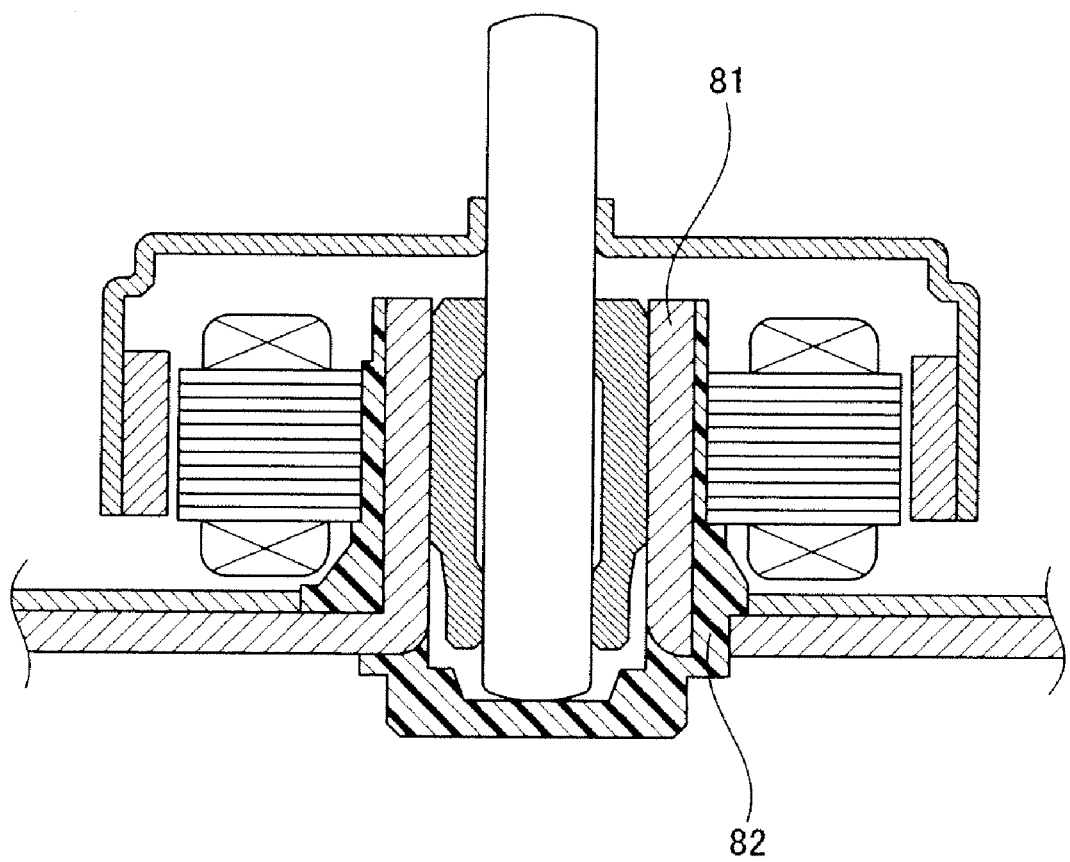
FIG. 7 is a sectional view showing still another brushless motor of the prior art.

In the first embodiment shown in FIGS. 1 and 2, the bearing housing 6, the installation member 25, and the stator base 1 are separately configured. The present embodiment is not limited to this configuration. As shown in FIG. 3, the bearing housing 6 and the installation member 25 may be integrally formed (to be specific, the base 6*b* of the bearing housing 6 and the annular section 25*a* of the installation member 25 in FIG. 1 may be integrally formed). Alternatively, as shown in FIG. 4, the bearing housing 6 and the stator base 1 may be integrally formed (to be specific, the base 6*b* of the bearing housing 6 and the stator base 1 in FIG. 1 may be integrally formed). Thus it is possible to reduce the number of components and the cost of manufacturing.

In the present embodiment, the thrust plate 7 and the thrust cover 8 are separately provided. The present embodiment is not limited to this configuration. The foregoing configuration may be applied to the integrally formed thrust plate 7 and thrust cover 8.

Further, in the present embodiment, the projection sections of the projecting pin sections 25*b* of the installation member 25 are welded to the portions where the recessed sections 8*b* of the thrust cover 8 are provided. The present embodiment is not limited to this configuration. Like the insertion holes 6*c* provided on the base 6*b* of the bearing housing 6 in FIG. 2, insertion holes may be provided on the thrust cover 8 and the projection sections of the projecting pin sections 25*b* may be projected from the points of the insertion holes. The present embodiment is not limited to this configuration. The thrust cover 8 may be simply disk-shaped with no irregularity on the outer periphery, and the bottom ends and so on of the projecting pin sections 25*b* may be arc-shaped in cross section along the outer periphery of the thrust cover 8.

Moreover, in the present embodiment, the legs of the terminals 11 are soldered to the flexible substrate 13 from the winding assemblies 12, each being made up of the core 9, the coil 10, and the terminal 11. The present embodiment is not limited to this configuration. The terminal lines of the coils 10 may be directly soldered to the flexible substrate 13 without using the terminals 11.

The brushless motor of the present invention is particularly suitable for small brushless motors. The present invention is applicable not only to small brushless motors but also to various kinds of brushless motors.

The invention claimed is:

1. A brushless motor, comprising: a stator serving as a non-rotating portion fixed to a base member; and
   a rotor serving as a rotating portion integrally rotating with a rotating shaft,
   the stator comprising:
   a bearing for rotatably holding the rotating shaft from an outer periphery;
   a bearing housing which includes a cylindrical section having the bearing mounted therein and a base placed on the base member and has the bearing placed vertically relative to the base member;
   a thrust plate which comes into contact with an end of the rotating shaft in a thrust direction and rotatably receives the end of the rotating shaft;
   a metal thrust cover for holding the thrust plate; and
   a metal installation member including an annular section which is superposed over the base of the bearing housing and projecting pin sections which pass through, from the annular section, insertion holes formed on the base member and project from points near an outer periphery of the thrust cover,
   wherein the projecting pin sections of the installation member have projection sections welded to the thrust cover, the projection sections projecting from the thrust cover;
   the thrust cover has a recessed section, which is recessed toward the center of the thrust cover in plan view; and
   the projection sections are welded to the recessed section.

2. The brushless motor according to claim 1, wherein the bearing housing and the installation member are integral.

3. The brushless motor according to claim 1, wherein the bearing housing and the base member are integral.

4. A method of manufacturing the brushless motor according to claim 1, comprising:
   projecting the projecting pin sections of the installation member from the points near the outer periphery of the thrust cover through the insertion holes of the base member; and
   welding the projection sections of the projecting pin sections to the thrust cover by arc discharge from points near the projecting pin sections.

* * * * *